(12) United States Patent
Baker et al.

(10) Patent No.: US 11,940,153 B2
(45) Date of Patent: Mar. 26, 2024

(54) FUEL CONDITIONER FOR GRILL

(71) Applicant: GMG Products, LLC, Lakeside, OR (US)

(72) Inventors: David Baker, Lakeside, OR (US); Wang Ping, Wuhan (CN)

(73) Assignee: GMG Products, LLC, Lakeside, OR (US)

( * ) Notice: Subject to any disclaimer, the term of this patent is extended or adjusted under 35 U.S.C. 154(b) by 0 days.

(21) Appl. No.: 17/167,804

(22) Filed: Feb. 4, 2021

(65) Prior Publication Data

US 2022/0170638 A1    Jun. 2, 2022

Related U.S. Application Data

(60) Provisional application No. 63/120,009, filed on Dec. 1, 2020.

(51) Int. Cl.
| | |
|---|---|
| *F24B 13/04* | (2006.01) |
| *A47J 36/32* | (2006.01) |
| *A47J 37/07* | (2006.01) |
| *B02C 4/08* | (2006.01) |
| *F23N 1/00* | (2006.01) |
| *F24B 5/08* | (2006.01) |

(52) U.S. Cl.
CPC .............. *F24B 13/04* (2013.01); *A47J 36/32* (2013.01); *A47J 37/0704* (2013.01); *A47J 37/0786* (2013.01); *B02C 4/08* (2013.01); *F23N 1/005* (2013.01); *F24B 5/087* (2013.01); *A47J 2202/00* (2013.01)

(58) Field of Classification Search
None
See application file for complete search history.

(56) References Cited

U.S. PATENT DOCUMENTS

| | | |
|---|---|---|
| 3,021,386 A | 2/1962 | Clark |
| 3,609,236 A | 9/1971 | Heilman |

(Continued)

FOREIGN PATENT DOCUMENTS

| | | | |
|---|---|---|---|
| CN | 206669789 U | * | 11/2017 |
| CN | 107616719 | | 1/2018 |

(Continued)

OTHER PUBLICATIONS

International Preliminary Report on Patentability dated May 17, 2022, in International Patent Application No. PCT/US2020/062211, 9 pages.

(Continued)

*Primary Examiner* — Jason Lau
(74) *Attorney, Agent, or Firm* — Lowe Graham Jones PLLC

(57) ABSTRACT

A cooking apparatus can include an enclosure defining a heating chamber configured to be heated and used for cooking food, a burn box proximate to the enclosure and which is configured to provide heat to the heating chamber, a hopper fluidly coupled to the burn box and configured to hold fuel, and a fuel conditioner disposed between the hopper and the burner to condition the fuel prior to burning in the burner. The fuel conditioner can be, for example, a wood chipper configured to reduce the size of the fuel.

13 Claims, 16 Drawing Sheets

(56) References Cited

U.S. PATENT DOCUMENTS

| | | | |
|---|---|---|---|
| 4,395,958 A * | 8/1983 | Caffyn | F23G 5/16 |
| | | | 110/165 R |
| 4,628,351 A | 12/1986 | Heo | |
| 4,711,979 A | 12/1987 | Glasser et al. | |
| 4,958,578 A * | 9/1990 | Houser | F23G 5/006 |
| | | | 110/212 |
| 5,094,280 A * | 3/1992 | Kahilahti | B23Q 5/04 |
| | | | 144/162.1 |
| 5,123,360 A * | 6/1992 | Burke | F24B 1/024 |
| | | | 126/61 |
| 6,229,563 B1 | 5/2001 | Miller, II et al. | |
| D782,864 S | 4/2017 | Bhogal et al. | |
| 9,644,847 B2 | 5/2017 | Bhogal et al. | |
| D802,996 S | 11/2017 | Bhogal et al. | |
| 9,927,129 B2 | 3/2018 | Bhogal et al. | |
| 10,024,544 B2 | 7/2018 | Bhogal et al. | |
| D861,409 S | 10/2019 | Bhogal et al. | |
| 10,523,851 B2 | 12/2019 | Armstrong | |
| 10,674,569 B2 | 6/2020 | Luckhardt et al. | |
| 10,778,876 B2 | 9/2020 | Goettlein | |
| 2006/0260603 A1 | 11/2006 | Shah | |
| 2007/0246453 A1 | 10/2007 | Nam et al. | |
| 2008/0085172 A1* | 4/2008 | Harman | F23K 3/16 |
| | | | 414/187 |
| 2009/0293860 A1* | 12/2009 | Carlson | F23B 40/08 |
| | | | 126/501 |
| 2010/0218754 A1* | 9/2010 | Kuntz | A47J 37/0786 |
| | | | 126/25 R |
| 2012/0076351 A1 | 3/2012 | Yoon et al. | |
| 2014/0026762 A1 | 1/2014 | Riefenstein | |
| 2014/0048055 A1 | 2/2014 | Ruther | |
| 2015/0285512 A1 | 10/2015 | Matarazzi et al. | |
| 2015/0285513 A1 | 10/2015 | Matarazzi et al. | |
| 2015/0371513 A1 | 12/2015 | Stokes | |
| 2016/0366314 A1 | 12/2016 | Pfaffinger, Jr. et al. | |
| 2017/0074522 A1 | 3/2017 | Cheng | |
| 2017/0115008 A1 | 4/2017 | Erbe et al. | |
| 2017/0261213 A1 | 9/2017 | Park et al. | |
| 2017/0303348 A1 | 10/2017 | Kondo et al. | |
| 2017/0332841 A1 | 11/2017 | Reischmann | |
| 2018/0058702 A1 | 3/2018 | Jang et al. | |
| 2018/0157232 A1 | 6/2018 | Chen | |
| 2018/0187898 A1 | 7/2018 | Matarazzi et al. | |
| 2018/0324908 A1 | 11/2018 | Denker et al. | |
| 2018/0347821 A1 | 12/2018 | Wild | |
| 2018/0372326 A1 | 12/2018 | Park et al. | |
| 2019/0285283 A1 | 9/2019 | Ebrom et al. | |
| 2020/0041134 A1 | 2/2020 | Luckhardt et al. | |
| 2020/0069111 A1 | 3/2020 | Eiter et al. | |
| 2020/0154943 A1 | 5/2020 | Baker | |
| 2020/0154944 A1 | 5/2020 | Baker | |
| 2020/0236743 A1 | 7/2020 | Yang et al. | |
| 2020/0281402 A1* | 9/2020 | Witzel | A47J 37/0704 |
| 2021/0071871 A1 | 3/2021 | Stork-Wersborg | |
| 2021/0113016 A1* | 4/2021 | Dean | F24B 13/04 |
| 2021/0222887 A1 | 7/2021 | Moore et al. | |
| 2021/0401223 A1 | 12/2021 | Han et al. | |

FOREIGN PATENT DOCUMENTS

| | | |
|---|---|---|
| CN | 213189188 U | 5/2021 |
| CN | 113558489 | 10/2021 |
| DE | 102008042804 | 4/2009 |
| JP | 2008286466 | 11/2008 |
| KR | 20160069359 | 6/2016 |

OTHER PUBLICATIONS

International Search Report and Written Opinion of the International Searching Authority completed Jan. 22, 2021, in International Patent Application No. PCT/US2020/062211, 10 pages.

* cited by examiner

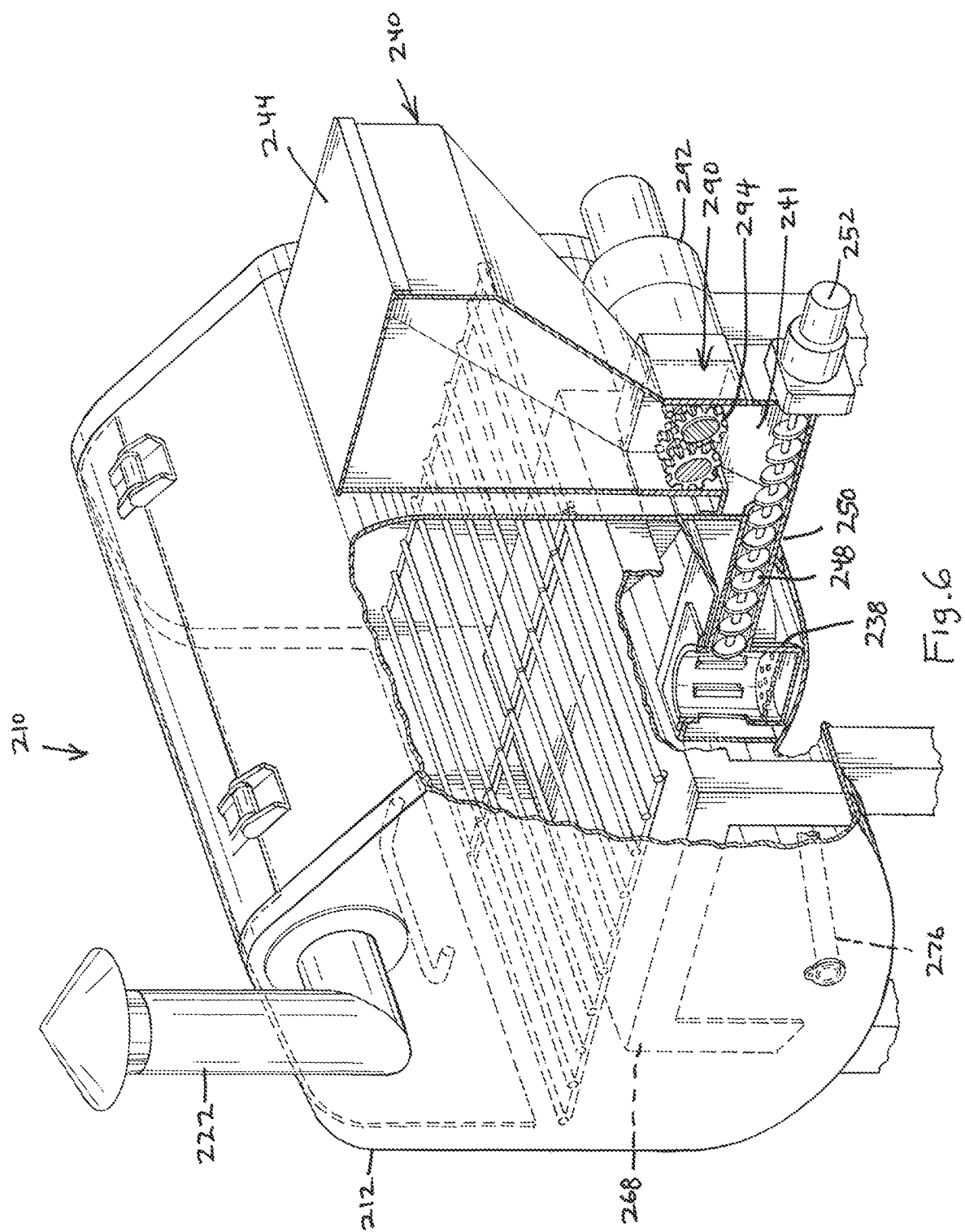

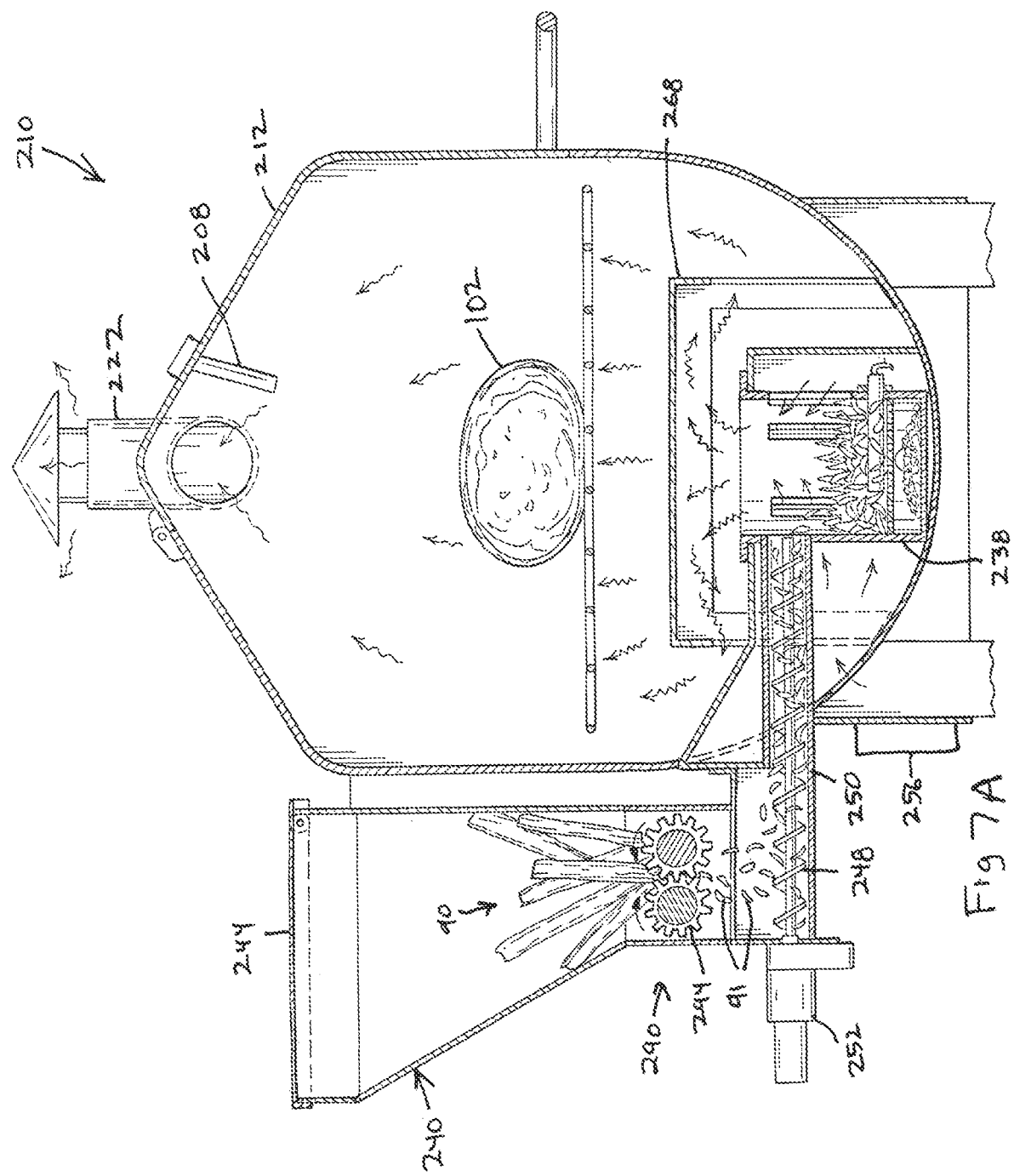

FUEL CONDITIONER FOR GRILL

CROSS REFERENCE TO RELATED APPLICATIONS

This application claims priority to U.S. Provisional Application No. 63/120,009, filed Dec. 1, 2020, which is incorporated herein by reference.

TECHNICAL FIELD

The present disclosure relates generally to cooking apparatuses. More specifically, the present disclosure relates to systems and methods for conditioning fuel, such as wood chips, for use in a cooking apparatus.

BACKGROUND

A pellet grill is a type of cooking apparatus that uses small pieces of wood—referred to as "pellets"—as fuel to heat and/or cook food. Pellets vary in size and shape, but typically have a cylindrical shape with a diameter of approximately one quarter inch and a length of approximately one quarter to about 1.5 inches in length. Pellets are typically manufactured at a specialized processing facility. Manufacturing pellets for use in a pellet grill is a complex, expensive, multistep process that can involve, for example, cleaning raw material (such as wood chips or wood shavings) to remove contaminants, drying the raw material, grinding the raw material into a powder, and pelletizing the raw material (for example by passing the raw material through a pressurized ring die). Pellet grills burn pellets as fuel to produce heat that is used to cook food.

Due to the complex and expensive processes required to produce wood pellets, the cost of wood pellets often far exceeds the cost of the raw materials (such as wood chips) from which the pellets can be made. This cost is passed on to pellet grill users, which increases the cost of use of pellet grills. Further, pellet grill users are also restricted to using only the limited set of commercially available pellets.

SUMMARY

In some aspects, a cooking apparatus includes an enclosure defining a heating chamber configured to be heated and used for cooking food; a burn box proximate to the enclosure and which is configured to provide heat to the heating chamber; a hopper fluidly coupled to the burn box and configured to hold fuel; and a fuel conditioner disposed between the hopper and the burner to condition the fuel prior to burning in the burner.

In some further aspects, the fuel comprises wood chips.

In some further aspects, the fuel conditioner comprises a wood chipper.

In some further aspects, the wood chipper comprises a plurality of gears.

In some further aspects, the wood chips have an average length of between $3/8$ inches to $2\,1/8$ inches.

In some further aspects, the conditioned fuel comprises at least one of smaller or more uniform wood chips.

In some further aspects, the hopper is fluidly coupled to the burn box via a channel.

In some further aspects, the fuel conditioner is disposed between the hoper and the channel.

In some further aspects, the channel comprises a chamber; a fan fluidly coupled to the chamber to provide positive pressure in the chamber; and an inclined surface at the base of the hopper and fluidly coupled to the channel, the inclined surface having at least one opening fluidly coupled to the chamber to provide positive pressure to the channel.

In some further aspects, the cooking apparatus includes an auger disposed at least partially within the channel and configured to move conditioned fuel from the fuel conditioner to the burn box.

In some further aspects, the cooking apparatus includes a conditioned fuel hopper fluidly coupled to the hopper and the channel and configured to hold conditioned fuel.

In some further aspects, the fuel conditioner modifies one or more of a size, shape, or a uniformity of the fuel.

In some further aspects, the cooking apparatus includes a control unit configured to control the temperature within the heating chamber.

In some further aspects, the control unit controls the temperature within the heating chamber at least in part by adjusting an amount of conditioned fuel supplied to the burn box at least in part by changing a control parameter of the fuel conditioner.

In some further aspects, the cooking apparatus includes: a channel fluidly coupled to the hopper and the burn box; and an auger disposed at least partially within the channel and configured to move conditioned fuel from the fuel conditioner to the burn box and wherein the control unit controls the temperature within the heating chamber at least in part by adjusting an amount of conditioned fuel moved to the burn box by the auger by changing a control parameter of the auger.

In some further aspects, the cooking apparatus includes a temperature sensor disposed in proximity to the heating chamber, wherein the control unit is configured to control the temperature within the heating chamber based at least in part on In some aspects, a method of operating a cooking apparatus includes: measuring a temperature of a heating chamber of the cooking apparatus; and controlling, based on the measured temperature of the heating chamber, a control parameter of a fuel conditioner fluidly coupled to a fuel hopper and a burn box of the cooking apparatus to condition fuel and change the supply of conditioned fuel supplied to the burn box.

In some further aspects, the fuel comprises wood chips and the fuel conditioner comprises a wood chipper.

In some aspects, a method of operating a cooking apparatus includes: conditioning fuel with a fuel conditioner; measuring a temperature of a heating chamber of the cooking apparatus; and controlling, based on the measured temperature of the heating chamber, a control parameter of an auger fluidly coupled to a burn box configured to heat a heating chamber for cooking food by burning conditioned fuel, wherein controlling the control parameter of the auger changes the supply of conditioned fuel supplied to the burn box.

In some further aspects, the fuel comprises wood chips and the fuel conditioner comprises a wood chipper.

In some aspects, the method or methods are controlled, at least in part, by at least one processor. A computer readable storage medium can have instructions stored thereon that cause the at least one processor to cause a cooking apparatus to perform at least some of the method steps.

In some aspects, an apparatus comprises: a hopper to house wood chips; a fuel conditioner fluidly connected with the hopper to condition wood chips for use as fuel in a cooking apparatus; and a mating member sized to mate with an opening to a hopper of the cooking apparatus, the mating member having an opening fluidly coupled with the fuel conditioner through which conditioned wood chips can exit the fuel conditioner and enter the hopper of the cooking apparatus.

In some aspects, the fuel conditioner comprises a wood chipper.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6 is a perspective partial cutaway view of a grill, according to some embodiments of the present disclosure.

FIGS. 7A-7B are a side cross-sectional views of grills, according to some embodiments of the present disclosure.

DETAILED DESCRIPTION

In some embodiments, systems and methods described herein relate to a cooking apparatus that includes a fuel conditioner (e.g., a wood chip conditioner) to condition fuel (e.g., wood chips) to be used to cook food in the cooking apparatus. For example, some embodiments described herein incorporate a grinding mechanism to reduce the size of wood chips that are provided to a burn box to burn the ground wood chips as fuel. Various example configurations of wood chip conditioner and cooking apparatuses are described in more detail throughout the present disclosure.

Figure 1A:
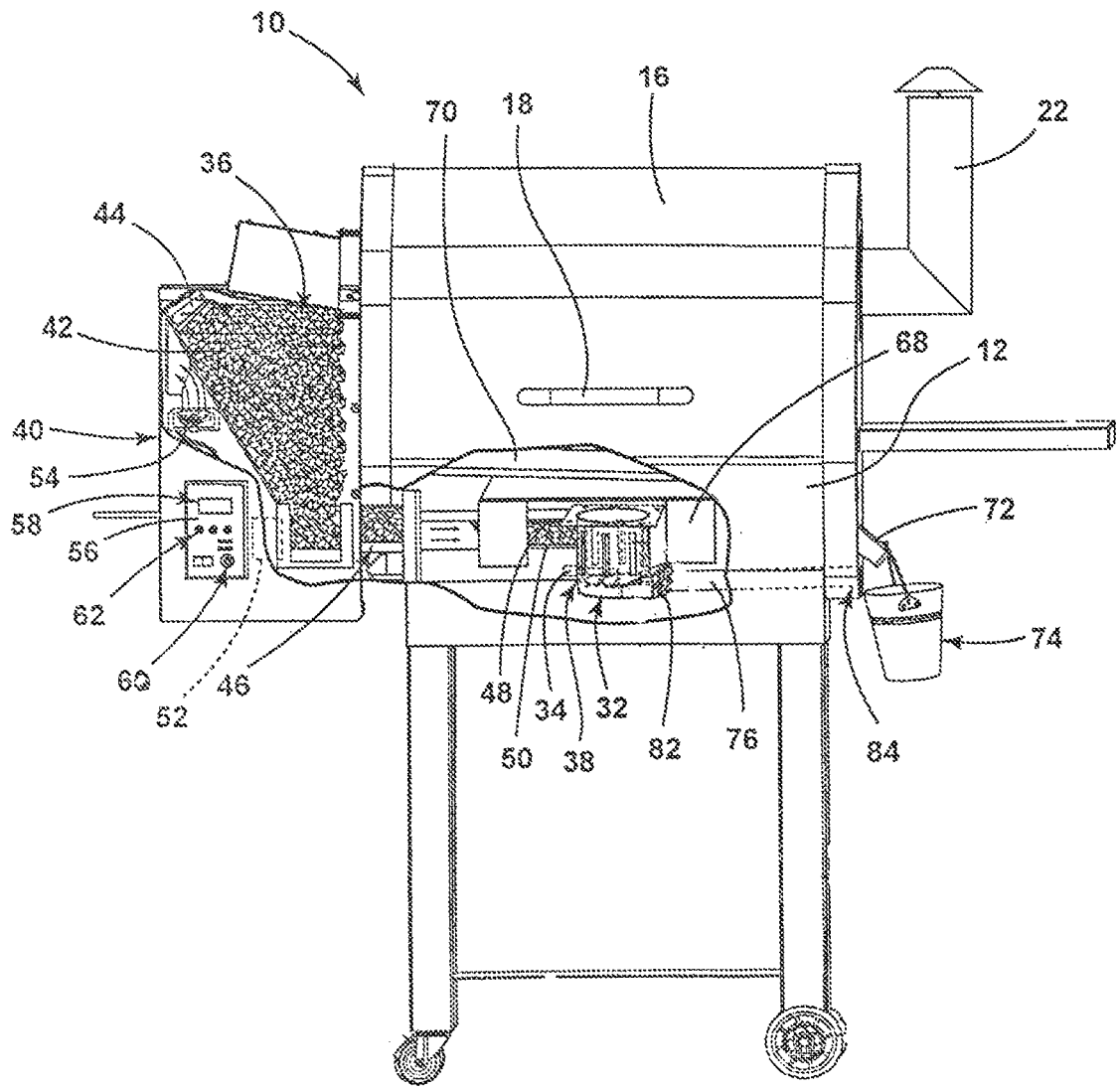
FIG. 1A is a front partial cutaway view of a prior art pellet grill.

Referring to FIG. 1A, a front partial cutaway view of a prior art pellet grill 10 is shown as described, for example in commonly assigned U.S. patent application Ser. No. 16/267,219 titled "COOKING DEVICE," filed Nov. 15, 2018. The present description is merely illustrative of an example prior art pellet grill 10, and is not to be considered limiting as to the subject matter described in U.S. patent application Ser. No. 16/267,219.

Figure 1B:
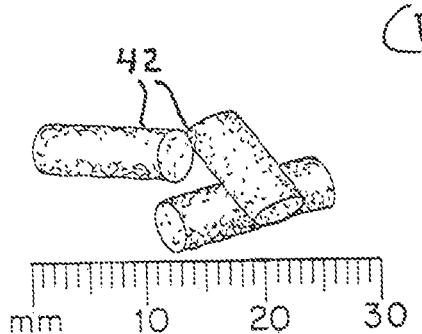
FIG. 1B is a perspective view of prior art wood pellets.

Pellet grill 10 uses an auger assembly 46 to provide fuel 36 (i.e., pellets 42, shown in more detail in FIG. 1B), to a burn box 38 that burns the fuel 36 to provide heat to heat or cook food. More specifically, pellet grill 10 includes a housing 12 that defines a heating chamber in which food items may be positioned for heating and/or cooking. A lid 16 with a handle 18 provides access to the heating chamber within the housing 12, for example to allow a user to place food within the heating chamber. Pellet grill 10 further includes a heating assembly 32 that burns fuel 36 to provide heat that heats and/or cooks food in the chamber. Heating assembly can be disposed in or in proximity to the housing 12. Heating assembly 32 includes a burn box 38 in which fuel, such as pellets, is ignited by ignitor 34 and burned to create heat. Heat is transferred from heating assembly 32 to heat plate 68, where it is then dissipated by the heat plate 68 throughout the heating chamber. To remove byproducts, such as ash, from the burn box 38, the burn box 38 can be fluidly connected to a first end potion 82 of a duct 76 having a second end potion 84 providing an exit path for byproduct out the side of the housing 12, for example into a bucket 74. The pellet grill 10 can include a hopper 40 to store fuel 36, such as pellets 42. Hopper 40 can include a panel 44 that functions as a lid to keep fuel 36 isolated from moisture outside the hopper 40. Hopper 40 can also include an auger assembly 46 having an auger 48 driven by motor 52 to move pellets 42 along channel 50 to the burn box 38. Pellet grill 10 can also include an exhaust conduit 22 to remove heat and/or smoke from the heating chamber and/or to adjust the heating characteristics within the chamber. Drain pan 70 collects and funnels drippings from food in the heating chamber to and out of discharge port 72, for example into a bucket 74.

The temperature in pellet grill 10 can be controlled, for example, using an electronic control unit 56. For example, electronic control unit 56 can control the auger 48 and/or operation of the heating assemblies 32 to moderate the supply and ignition of fuel 36 in the burn box 38 to reach and/or maintain a desired temperature therein. A grill user can set and monitor the desired and present temperature using user interface elements of the control unit 56, such as, but not limited to, display 58, speaker/receiver 60, and/or input device 62. The control unit 56 can also provide other functionalities of the pellet grill 10 via the user interface elements 58, 60, and 62, such as, but not limited to, timer functions, delayed start functions, notification functions, etc. Control unit 56 can also control the operation of one or more fans 54 and/or a flap in the exhaust conduit 22 to assist with maintaining the temperature in the heating chamber. Control unit 56 can also be connected to one or more temperature probes in the heating chamber or anywhere else on the pellet grill 10 to monitor and control temperature in the heating chamber.

Figure 1C:
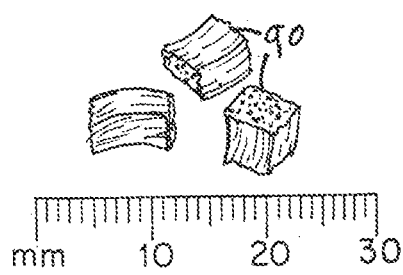
FIG. 1C is a perspective view of wood chips, according to some embodiments of the present disclosure.

In some embodiments, wood chips 90, such as those shown in FIG. 1C, are an alternative or preferable fuel source to pellets 42. Wood chips 90 are not pellets 42, and have not been processed or pressed into pelletized form. In some embodiments, the absence of (or lack of a requirement to use) pellets 42 for a grill is an important and innovative feature of a grill. Eliminating the need to use pellets 42 creates various novel and non-obvious benefits. For example, wood chips are easier, quicker, and cheaper to manufacture. Manufacturing wood chips do not require complex and expensive equipment, such as ring dies, as is required for manufacturing pellets. There are many commercially available woodchippers that are presently sold at a fraction of the cost of the equipment required to manufacture wood pellets, and that can be operated more cheaply. There are also more wood chip manufacturers than wood pellet manufacturers that offer products from a wider variety of wood sources at a lower cost per unit weight than wood pellets. Wood chips are already more widely available on the market and are used in many applications ranging from landscaping to paper manufacturing. Thus, using wood chips as fuel can save time and expense, both for fuel manufacturers and for grill users. In addition, because the taste of grilled food can depend in part on the type of wood used as fuel, making more wood types available to grill users would allow users to experiment with a greater range of flavors. In another example, in some embodiments, wood chips can also produce more smoke than pellets, for example due to a higher water content. In some embodiments, wood chips can contain as much as 32-40% water (for example, as measured by weight), which is a larger amount than wood chips. This increased water content can provide grill users with more options for the flavor of the food prepared in a grill. Further, while pellets disintegrate when exposed to water, wood chips do not. Thus, wood chips are a more durable fuel source. In another example, wood pellets for use in grills are prone to fall apart during transportation, use, and when subject to pressure by weight. Vibration during transportation, for example, can cause the pellets to disintegrate into dust, which is not usable in a pellet grill. While packaging pellets to reduce the impact of vibration and the weight of other pellets above can help to reduce this, the amount of usable pellets can be reduced by as much as 10% for example by the time a user brings the pellets to the location of their grill. This is not a problem for wood chips, which do not significantly deteriorate during transportation.

Commercially available pellet grills, such as the pellet grill 10 shown in FIG. 1A, are not suited for burning wood chips 90 as fuel. Other types of fuel, such as wood chips 90 shown in FIG. 1C, are too large and inconsistent in size and shape to fit through channel 50. For example, some wood chips could be ⅜ inches to 2 and ⅛ inches long, or even as long as 3-4 inches, 7-8 inches, or more. In some embodiments, the wood chips could be approximately 2×2×2 inches. A person of ordinary skill in the art would recognize from the present disclosure that other sizes could be used. Furthermore, larger and more inconsistently shaped wood chips 90 can be harder for auger 48 to move. If the motor 52 is not strong enough to move larger or irregularly shaped wood chips 90 from the hopper 40 to the burn box 38, the auger could jam, thereby shutting down the fuel supply for the grill 10. Providing a motor strong enough to force large wood chips into the burn box would significantly increase the cost of grills.

Embodiments of the present disclosure solve these problems with a fuel conditioner, such as a wood chip conditioner configured to allow burning of wood chips 90 as fuel for a cooking apparatus. A wood chip conditioner can condition wood chips, for example, by making the wood chips 90 smaller and/or more evenly shaped for use as fuel in a grill.

Figure 2:
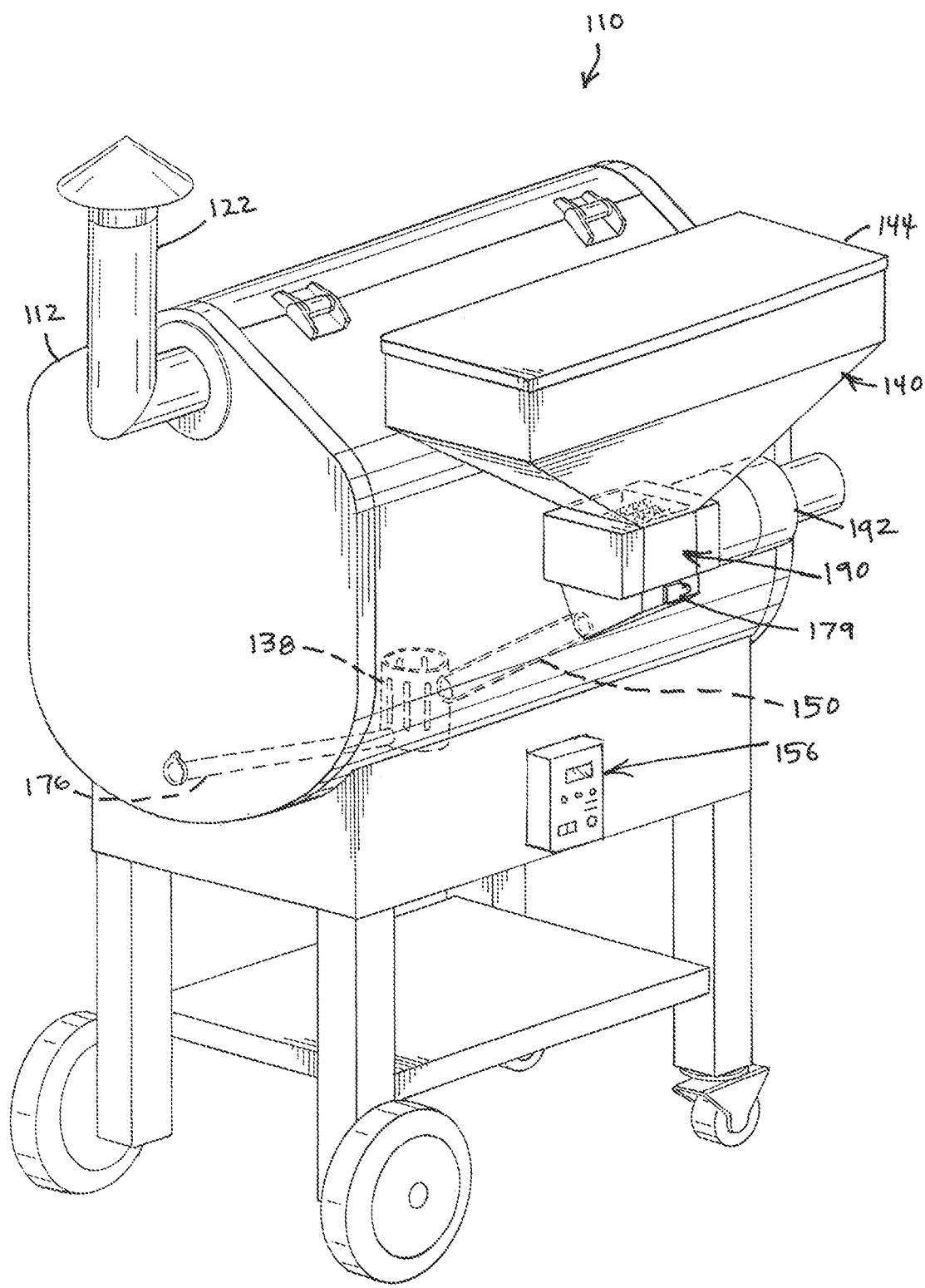
FIG. 2 is a perspective view of a grill, according to some embodiments of the present disclosure.
Figure 3:
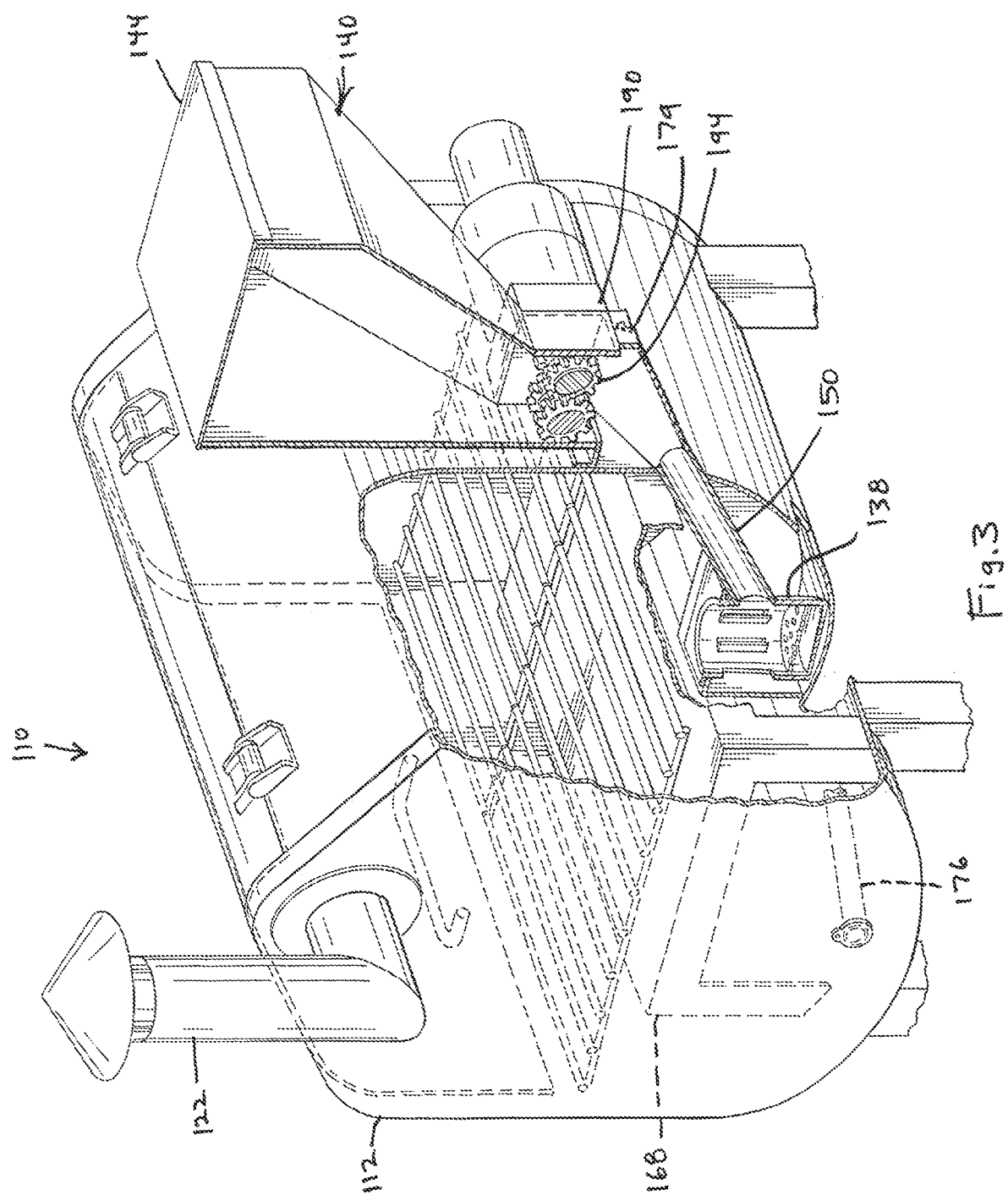
FIG. 3 is a perspective partial cutaway view of a grill, according to some embodiments of the present disclosure.
Figure 4:
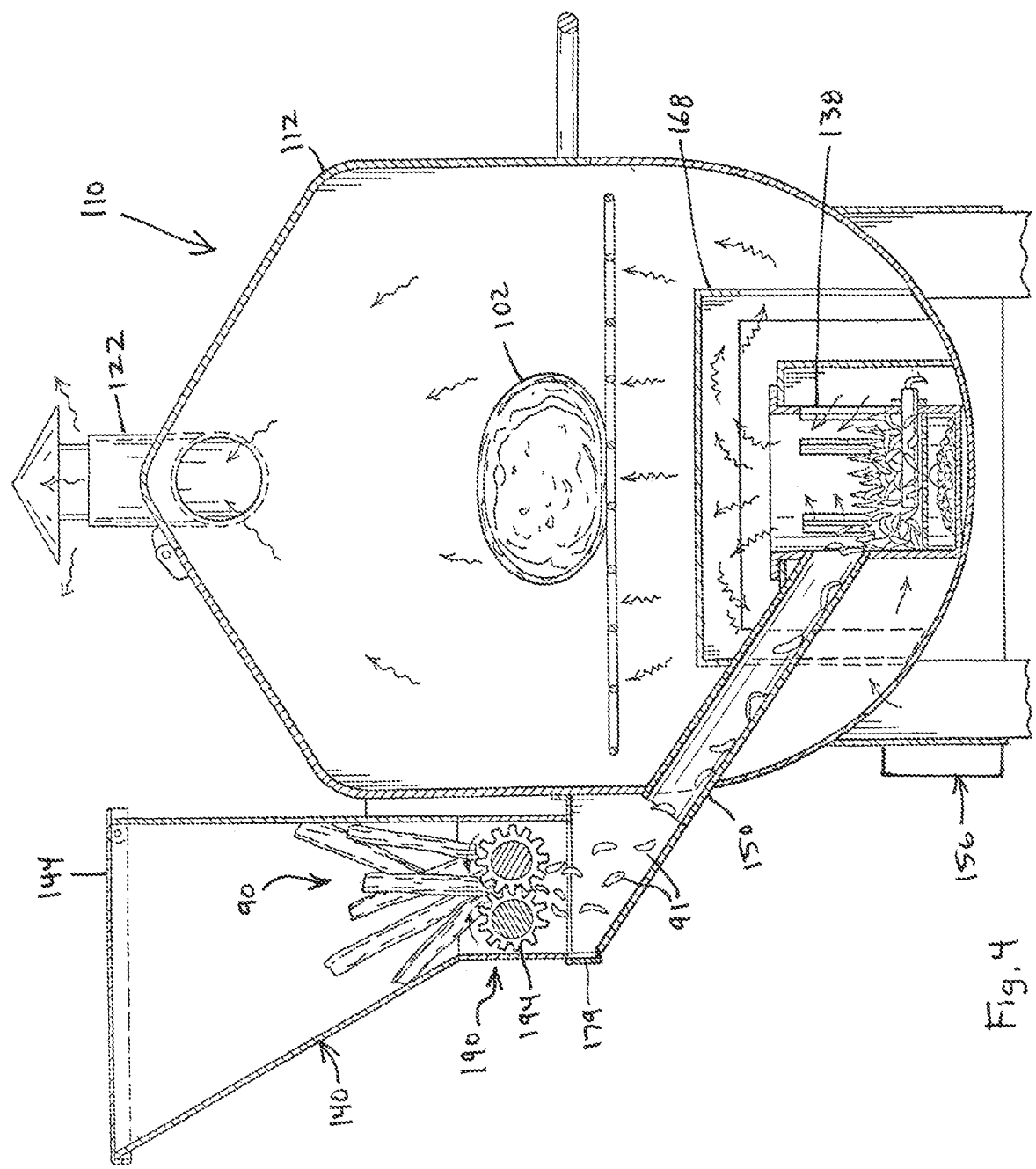
FIG. 4 is a side cross-sectional view of a grill, according to some embodiments of the present disclosure.

Referring to FIGS. 2-4, perspective, perspective partial cutaway, and side cross-sectional views, respectively, of a grill 110 with a fuel conditioner, such as wood chip conditioner 190, are shown, according to some embodiments of the present disclosure. Grill 110 includes a housing 112 defining a heating chamber, a burn box 138, a hopper 140 (with a lid 144), and an exhaust conduit 122. During operation, fuel is provided from hopper 140 to the burn box 138, where heat from the burning fuel transfers to heat plate 168, which in transfers heat to food 102 in the heating chamber via radiation and/or convection. Exhaust, such as heat and/or smoke from the heating chamber can escape through exhaust conduit 122. Waste from the burn box 138, such as ash, is be removed at least in part via the duct 176 fluidly connected to the burn box 138.

Grill 110 includes a fuel conditioner, such as wood chip conditioner 190 that facilitates use of wood chips 90, instead of pellets 42, as fuel, according to some embodiments of the present disclosure. Wood chips 90 of varying sizes can be stored in hopper 140. Wood chip conditioner 190 is located at the base of the hopper 140 to condition wood chips. In some embodiments, wood chip conditioner 190 includes a plurality of gears 194 or any other form of conditioning device, such as, but not limited to, one or more fly wheels with knife blades, one or more rotating chipper blades, or any other device configured to condition wood chips 90. One or more motors 192 drives wood chip conditioner 190 to condition wood chips 90 into conditioned wood chips 91 (for example by grinding wood chips 90 with gears 194) such that the wood chips are suitable for use as fuel in burn box 138. In some embodiments, conditioned wood chips 91 are smaller and/or more evenly sized. A person of ordinary skill in the art would understand from the present disclosure that maximum and/or average size of conditioned wood chips 91 can be selected for a particular cooking apparatus. In some embodiments, one or more components in the wood chip conditioner 190 are removeable replaceable. For example, one or more of the gears 194 could be removable coupled inside the wood chip conditioner 190 such that they can be replaced when they wear out. In another example, individual blades in a wood chip conditioner 190 are removeable and replaceable.

Figure 10:
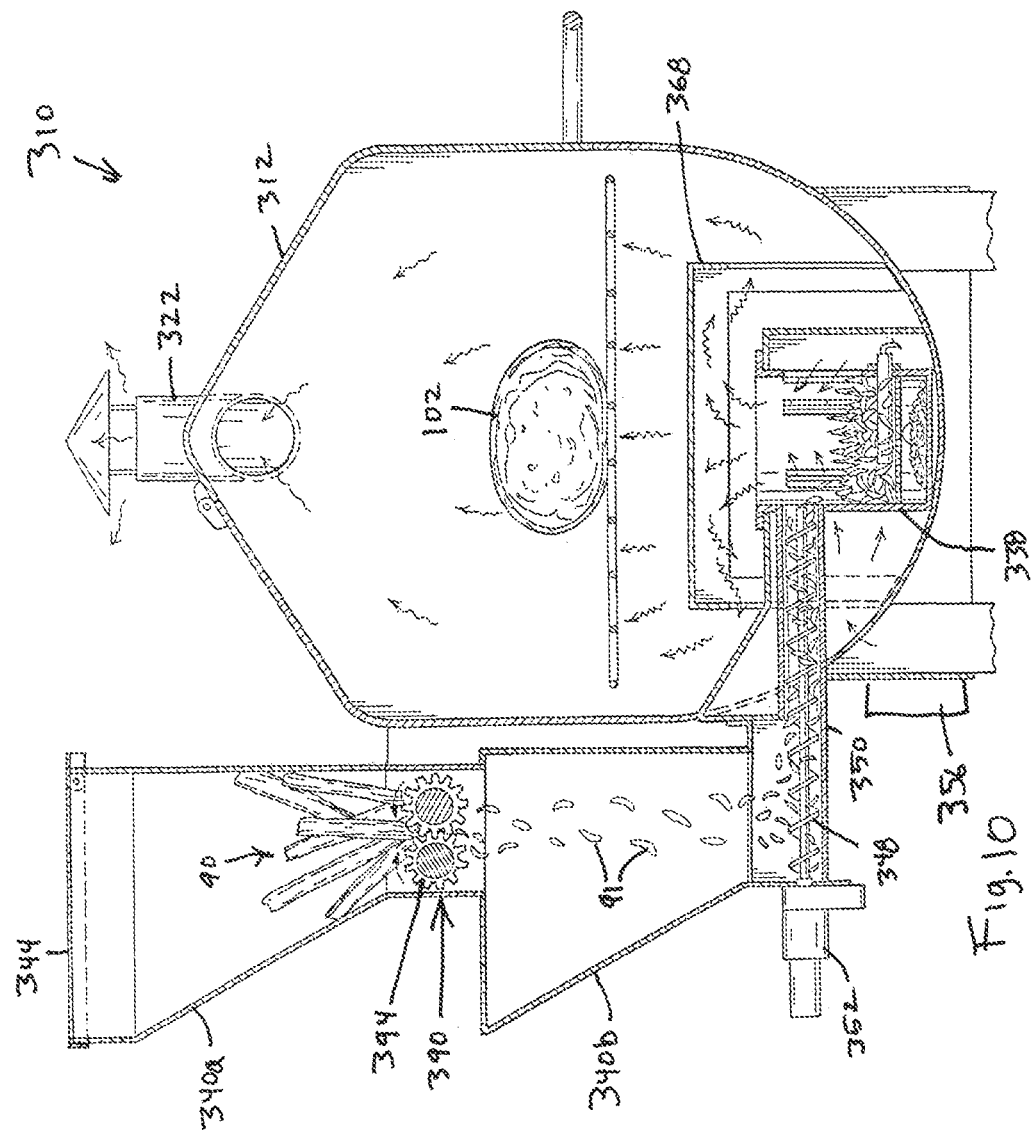
FIG. 10 is a side cross-sectional view of a grill, according to some embodiments of the present disclosure.
Figure 11:
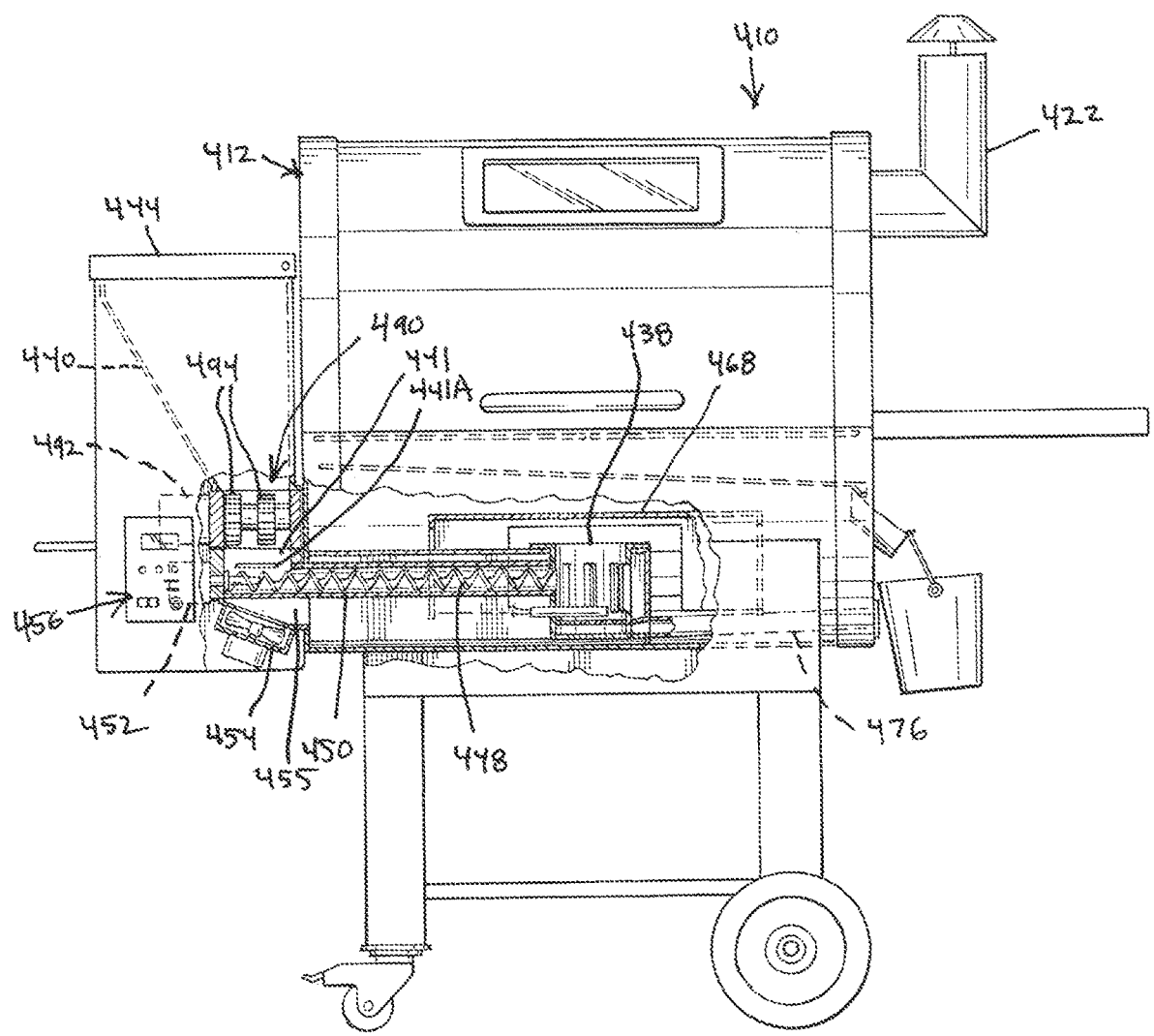
FIG. 11 is a partial cutaway view of a grill, according to some embodiments of the present disclosure.

Grill 110 also includes a channel 150 fluidly coupled to the outlet of wood chip conditioner 190 to the burn box 138. A person of skill in the art would understand from the present disclosure that other intermediate elements can be included between the channel 150 and one or both of the conditioner 190 and burn box 138. Channel 150 can have a diameter of, for example, 2.2 inches, 2-2.5 inches, 1.5-3 inches, or any other diameter sized to pass conditioned wood chips 91. Conditioned wood chips 91 exiting the conditioner 190 can travel through the channel 150 to burn box 138 for use as fuel. Channel 150 can have a smooth inner surface to facilitate passage of conditioned wood chips 91 to the burn box 138. A person of ordinary skill in the art would understand from the present disclosure that channel 150 can be sized to ensure that maximum and/or average sized conditioned wood chips 91 can pass therethrough at a rate sufficient to maintain typical and/or maximum desired cooking temperatures within the heating chamber. Advantageously, in some embodiments, channel 150 is formed at an angle relative to a horizontal line running through the grill 110 such that it acts as a gravity feed for conditioned wood chips 91. In such embodiments, the gravity permits gravity to cause conditioned wood chips 91 to travel from the outlet of the wood chip conditioner 190 through the channel 150 to the burn box 138. In such embodiments, an auger or conveyor is not required to assist with transporting conditioned wood chips 91 from the wood chip conditioner 190 to the burn box 138. However, it is complicated that an auger in the channel 150 and an associated driving mechanism (such as, but not limited to, a motor) can be used to assist with transporting conditioned wood chips 91 from the wood chip conditioner 190 to the burn box 138, whether with a gravity feed as shown in FIGS. 2-4 or without a gravity feed as discussed in more detail with reference to FIGS. 5A-10. In some embodiments a fan (for example, as shown in the embodiment of FIG. 11) is fluidly connected to the outlet of the wood chip conditioner 190 and/or the channel 150 to facilitate air flow throughout the grill 110. Additionally or alternatively, a fan can be fluidly connected to the exhaust conduit 122 to facilitate temperature control and/or removal of exhaust. Exhaust conduit 122 can be fitted with a fan and/or a flap to further to further assist with temperature control and/or removal of exhaust. Screens and/or filters can be implemented in one or more locations throughout the grill 110 to keep dust from conditioned wood chips 91 out of the heating chamber and/or away from the food.

In some embodiments, the grill 110 includes an access port 179. Access port 179 provides access from outside the grill 110 to the outlet of the wood chip conditioner 190 and to the interior of the channel 150. Access port 179 can comprise a lid, a screw cap, or any other type of access port that can be fixedly shut so as to prevent conditioned wood chips from being expelled from the access port 179 during normal operation and also removed to provide access to the wood chip conditioner 190 and to the interior of the channel 150. In the event that one or more conditioned wood chips 91 becomes stuck in the channel 150, a grill user can open the access port and use a tool, such as, but not limited to, a long screw driver, a stick, a dowel, or any other item to push the wood chip(s) 91 that may have become stuck through the channel 150 and into the burn box 138.

The temperature in grill 110 can be controlled, for example, with an electronic control unit 156, according to some embodiments. For example, electronic control unit 156 can operate similarly to the control unit 56 discussed with reference to FIG. 1A to moderate the supply and ignition of fuel in the burn box 138 to reach and/or maintain a desired temperature in the heating chamber. In some embodiments in which channel 150 is configured as a gravity feed, control unit 156 can moderate a control parameter of the wood chip conditioner 190 (for example, by turning it on and off or by changing a speed or power of the wood chip conditioner) to control the supply of conditioned wood chips 91 as fuel. In some embodiments where an auger is provided in the channel 150, control unit 156 can moderate one or more control parameters of the auger and/or the wood chip conditioner 190 to supply conditioned wood chips 91 to the burn box 138 as fuel.

In some embodiments, a grill user can record and monitor the desired and/or present temperature using user interface elements of the control unit 156, such as, but not limited to, a display 158, speaker/receiver 160, and/or input device 162. The control unit 156 can also provide other functionalities via the user interface elements 158, 160, and 162, such as, but not limited to, timer functions, delayed start functions, notification functions, etc. Control unit 156 can also control the operation of one or more fans and/or a flap in the exhaust conduit 122 to assist with maintaining the temperature in the heating chamber and/or removing exhaust. Control unit 156 can also be connected to one or more temperature probes in the heating chamber or anywhere else on or in the pellet grill 110 to monitor and control temperature in the heating chamber.

In some embodiments, channel 150 can be fitted with one or more sensors (not shown). Sensors can be configured to detect one or more of a temperature in the channel 150, a flow of conditioned wood chips 91 in the channel 150, and/or an amount of wood chips 91 in the channel 150. In some embodiments, control unit 156 can monitor the conditions in channel 150 to determine if a wood chip 91 is stuck in the channel 150. Control unit 156 can notify a user that a wood chip 91 is stuck in the channel 150, for example, using user interface elements on the control unit. In some embodiments the grill 110 can include an access port 79 that the user can use to clear stuck wood chips 91 in the channel 150, for example by inserting a long probe into the channel 150 through the access port. Access port 179 can take many different forms, such as, but not limited to a hole with a lid and fixing device or a screw on cover.

Although the embodiments of FIGS. 2-4 depict control unit 156 on a side of grill 110, a person of ordinary skill in the art would understand from the present disclosure that the disclosed inventions are not limited to a particular placement of the control unit 156. For example, control unit 156 could be implemented on a front or other side of the grill 110, and/or as a separate remote unit. Similarly, although FIGS. 2-4 depict hopper 140 and wood chip conditioner 190 on a back side of the grill 110, a person of ordinary skill in the art would understand from the present disclosure that the disclosed inventions are not limited to a particular placement of the hopper 140 and/or wood chip conditioner 190. For example, in some embodiments, the hopper and wood chip conditioner 190 are located on a side surface of the grill 110.

Referring to FIGS. 5A-7B, perspective, perspective partial cutaway, and side cross-sectional views, respectively, of a grill 210 with a fuel conditioner, such as wood chip conditioner 290, are shown, according to some embodiments of the present disclosure. Grill 210 includes housing 212, exhaust conduit 222, hopper 240, lid 244, control unit 256, conduit 276, burn box 238, wood chip conditioner 290, motor 292, gears 294, and heat plate 268/268A that are configured and operate similar to the housing 112, exhaust conduit 122, hopper 140, lid 144, control unit 156, conduit 176, burn box 138, wood chip conditioner 190, motor 192, gears 194, and heat plate 168 described with reference to FIGS. 2-4 to cook food 102 using wood chips 90 conditioned into conditioned wood chips 91. Further, as shown in FIGS. 5A-7B, grill 210 includes a channel 250 fluidly coupled to the outlet of the wood chip conditioner 290 and the burn box 238, and an auger 248 at least partially within the channel 250 and driven by motor 252.

In some embodiments, during operation, motor 252 can drive auger 248 to move conditioned wood chips from the wood chip conditioner 190 through channel 250 to burn box 238. While the channel 250 and auger 248 are shown parallel to a horizontal line through the grill 210, a person of ordinary skill in the art would understand from the present disclosure that the channel 250 can alternatively be configured as a gravity feed with both the channel 250 and the auger 248 positioned at an angle to the horizontal such that gravity and the auger 248 assist with moving conditioned wood chips 91 from through the channel 250 to the burn box 238. In some embodiments, grill 210 can include an inclined surface 241 beneath wood chip conditioner 290 to assist with feeding conditioned wood chips 91 toward the auger 248.

In some embodiments, control unit 256 can operate similarly to control unit 156 described with reference to FIGS. 2-4. Referring to FIGS. 5A-7B, in some embodiments, control unit 256 can adjust control parameters of one or both of the wood chip conditioner 290 and the auger 248 (for example, control parameters of the motors 292 and 252, respectively) to assist with moderating temperature within the heating chamber of the housing 212. In some embodiments, control unit 256 can control the motor 252 to cause the auger 248 to operate continuously (or near-continuously) while moderating the speed of the motor 292 to moderate the amount of wood chips 91 provided to the burn box 238. Such a control scheme ensure that the auger always contains wood chips 91 to prevent the fire in burn box 238 from going out while still maintaining control of the heat in the housing 212. In some embodiments, a volume of wood chips 91 per amount (or time and speed) of grinder revolution is provided as a preset control parameter to the control unit 256. The control unit can further use other measured and preset operational parameters, for example from temperature sensors, etc., to determine an amount of fuel required to maintain or produce a desired temperature (for example, a temperature set by a user). Control unit 256 can then operate the motor 292 to produce the desired amount of fuel.

Figure 5A:
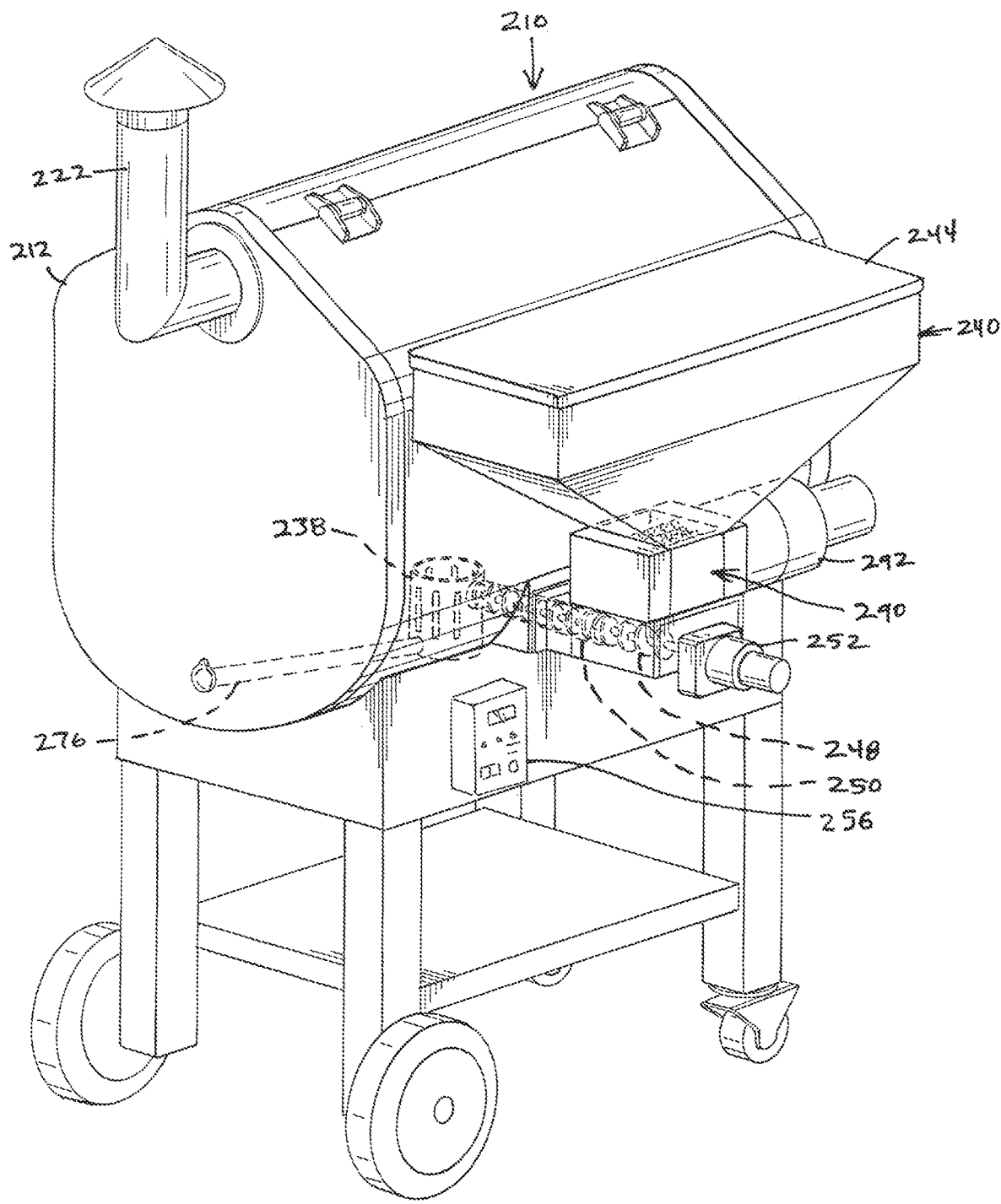
FIGS. 5A-5B are perspective views of grills, according to some embodiments of the present disclosure.
Figure 5B:
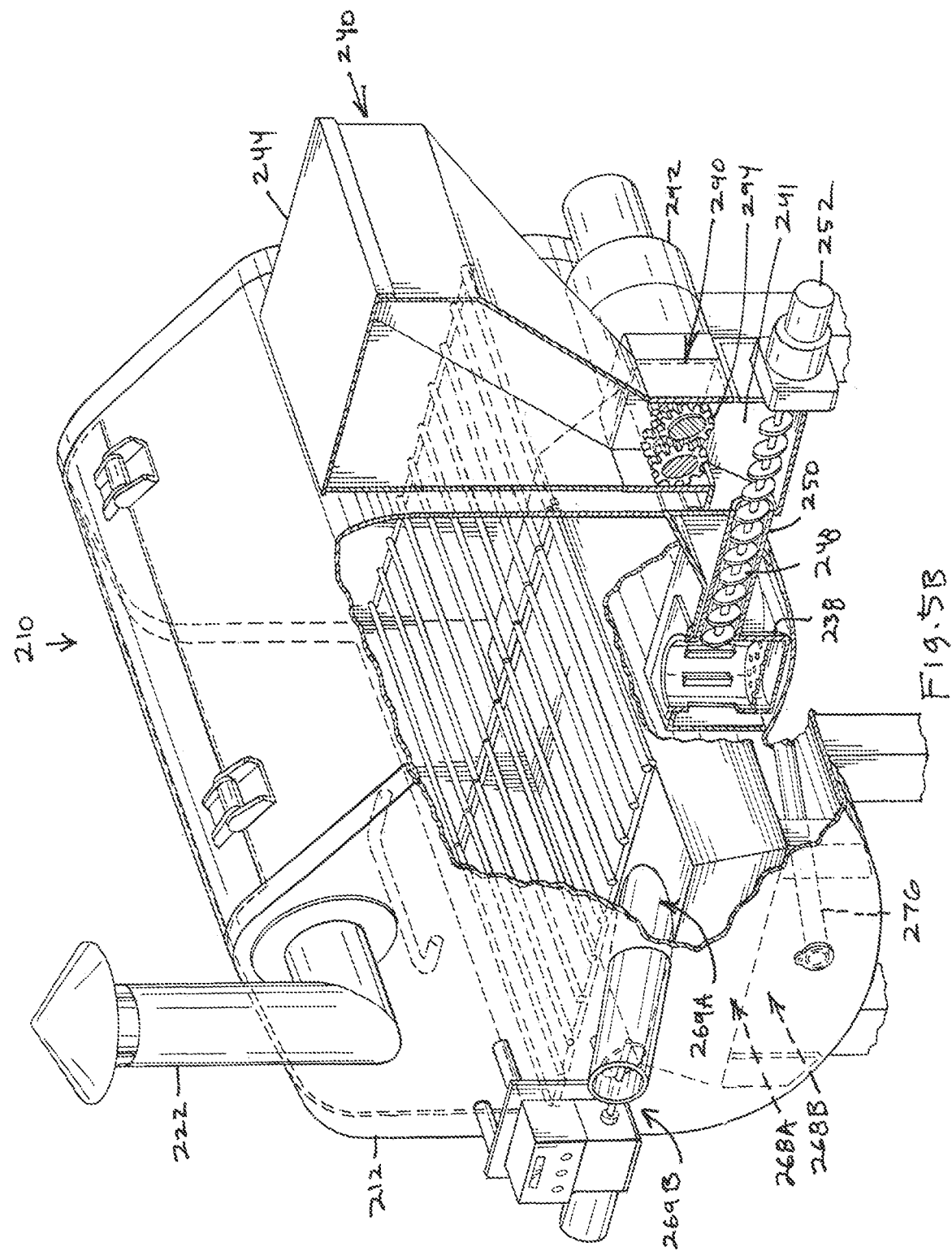
Figure 7B:
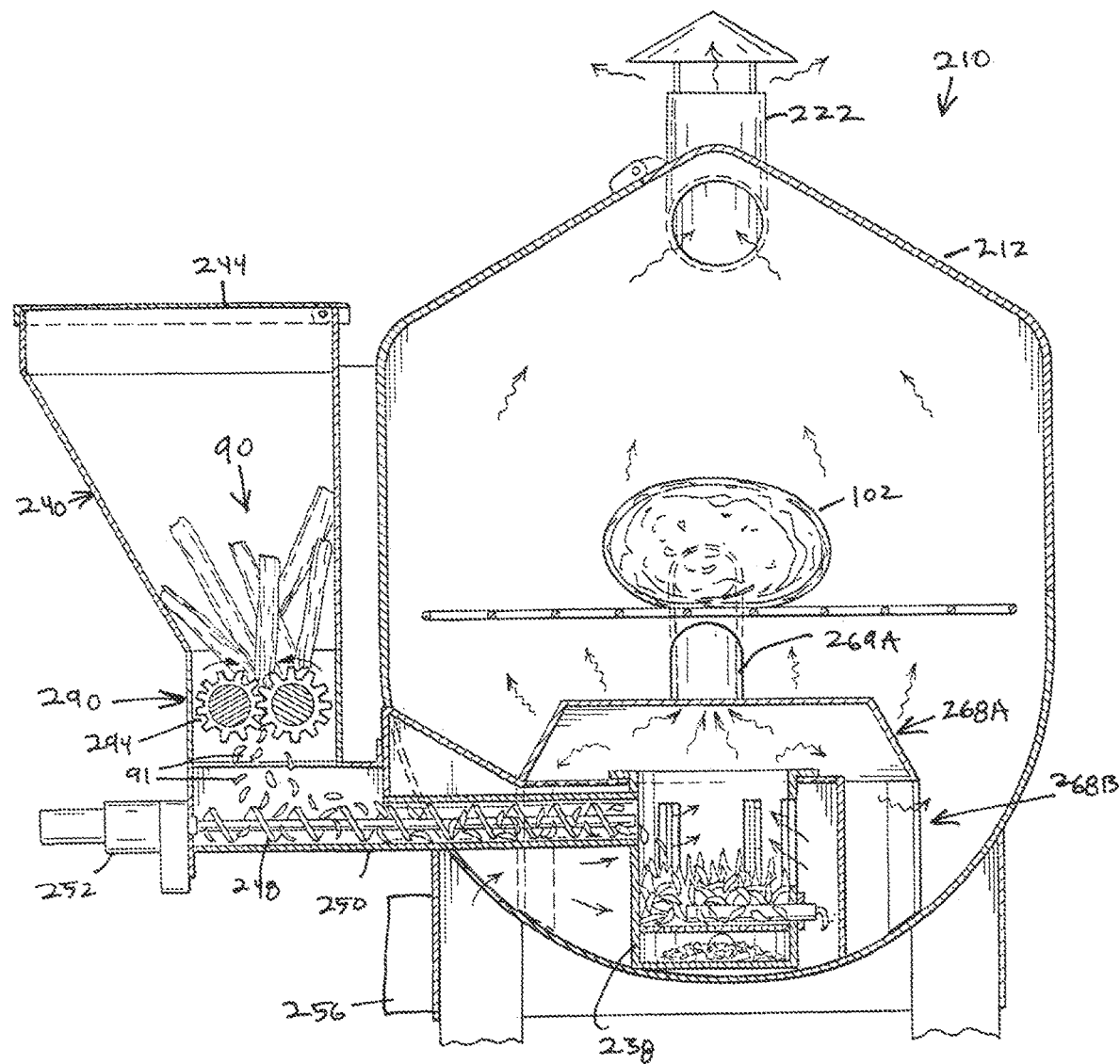

In some embodiments, wood chips 91 can produce more smoke during burning, for example due to a higher water content than pellets. Referring to FIGS. 5B and 7B, in some embodiments, the grill 210 can include a smoke control system to allow a user to control the level of smoke provided to the food 102. For example, a smoke control system can include a heat plate 268A with a beveled 268B to trap smoke exiting from the top of the burn box 238. A smoke relief conduit 269A can fluidly connect the beveled heat plate 268 to the outside of the grill 210 and can vent smoke rising upward from the burn box 238 to the outside of the grill. Smoke relief conduit 269A can fluidly connect to or near the upper surface of the heat plate 268A and can be provided at an angle above the horizontal to assist with venting smoke from the inside of the grill 210. In some embodiments, the smoke relief conduit 269A can include a damper 269B, such as, but not limited to, an electronically actuated flap, that can allow for adjustment of the amount of smoke that is vented from the inside of the grill 210. In some embodiments, the damper 269B can be connected to control unit 256, which can be used to control the amount of smoke in the grill 210. For example, a user can set the amount and/or timing that the damper 269B is open. In some additional or alternative embodiments, a smoke sensor can be mounted in the grill 210, for example on the housing 212 above or near the food 102, to determine an amount or density of smoke in the grill chamber. Information about the smoke can be provided to the control unit 256, which can moderate operation of the damper 269B to maintain the smoke levels at a desired amount. While FIG. 5B shows the beveled heat plate 268A having generally flat surfaces, flat beveled edges 268B, and a smoke relief conduit 269A connected to an upper edge thereof, other configurations of a beveled heat plate 268A and smoke relief conduit 269A are contemplated in order to trap smoke above burn box 238 and vent it via a smoke relief conduit 269A to the exterior of the grill 210. A person of ordinary skill in the art would understand from the present disclosure that a beveled heat plate 268A with a smoke relief conduit 269A could be implemented for any of the disclosed embodiments. While FIG. 5A shows the damper 269B at the outlet end of the smoke relief conduit 269A, damper 269B can be placed at any location in the conduit 269A. Further, other types of control mechanisms are contemplated in addition to or as an alternative to damper 269B, such as, but not limited to, a sliding or hinged door. Such alternative or additional control mechanisms can be manually or electronically controlled.

Figure 8:
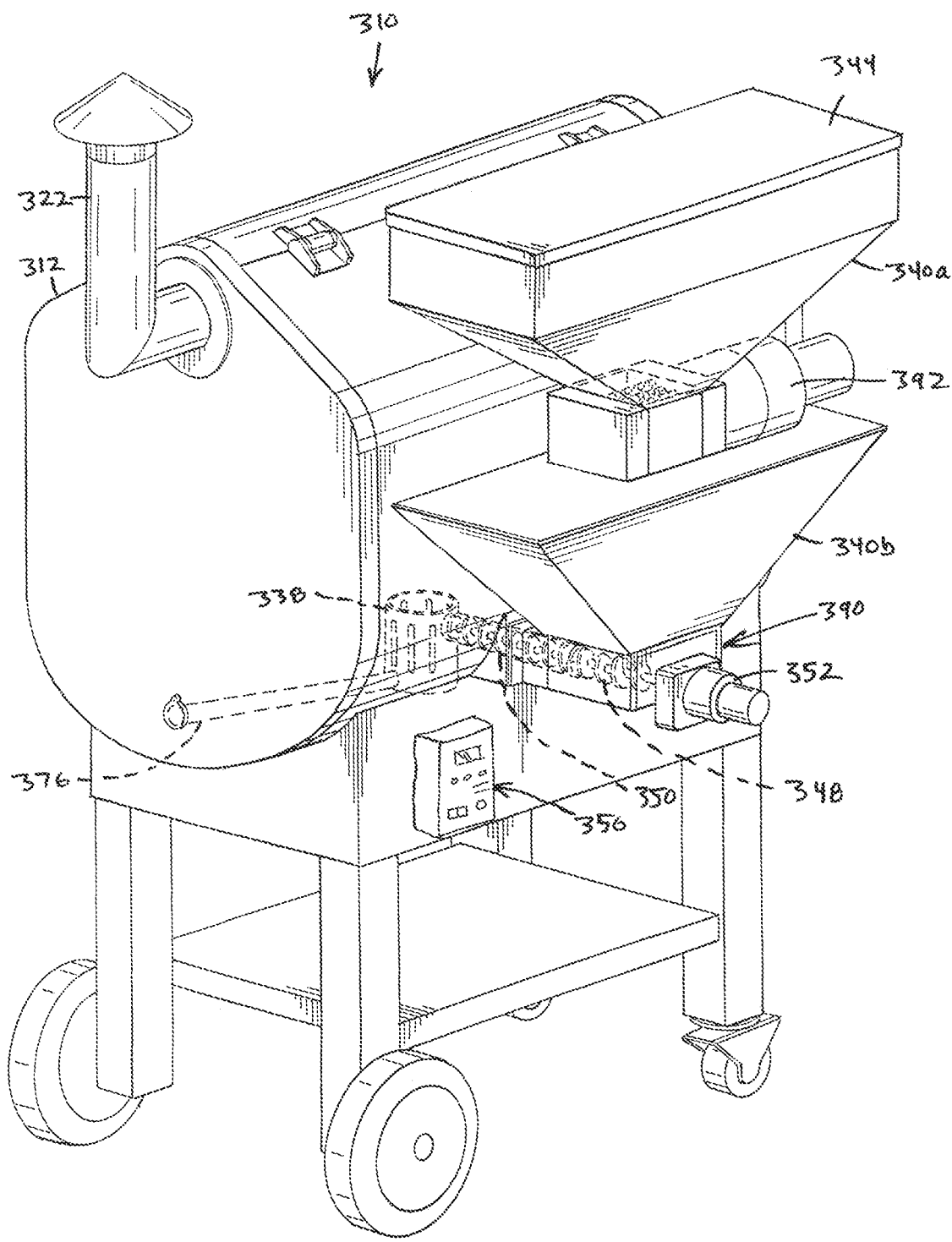
FIG. 8 is perspective view of a grill, according to some embodiments of the present disclosure.
Figure 9:
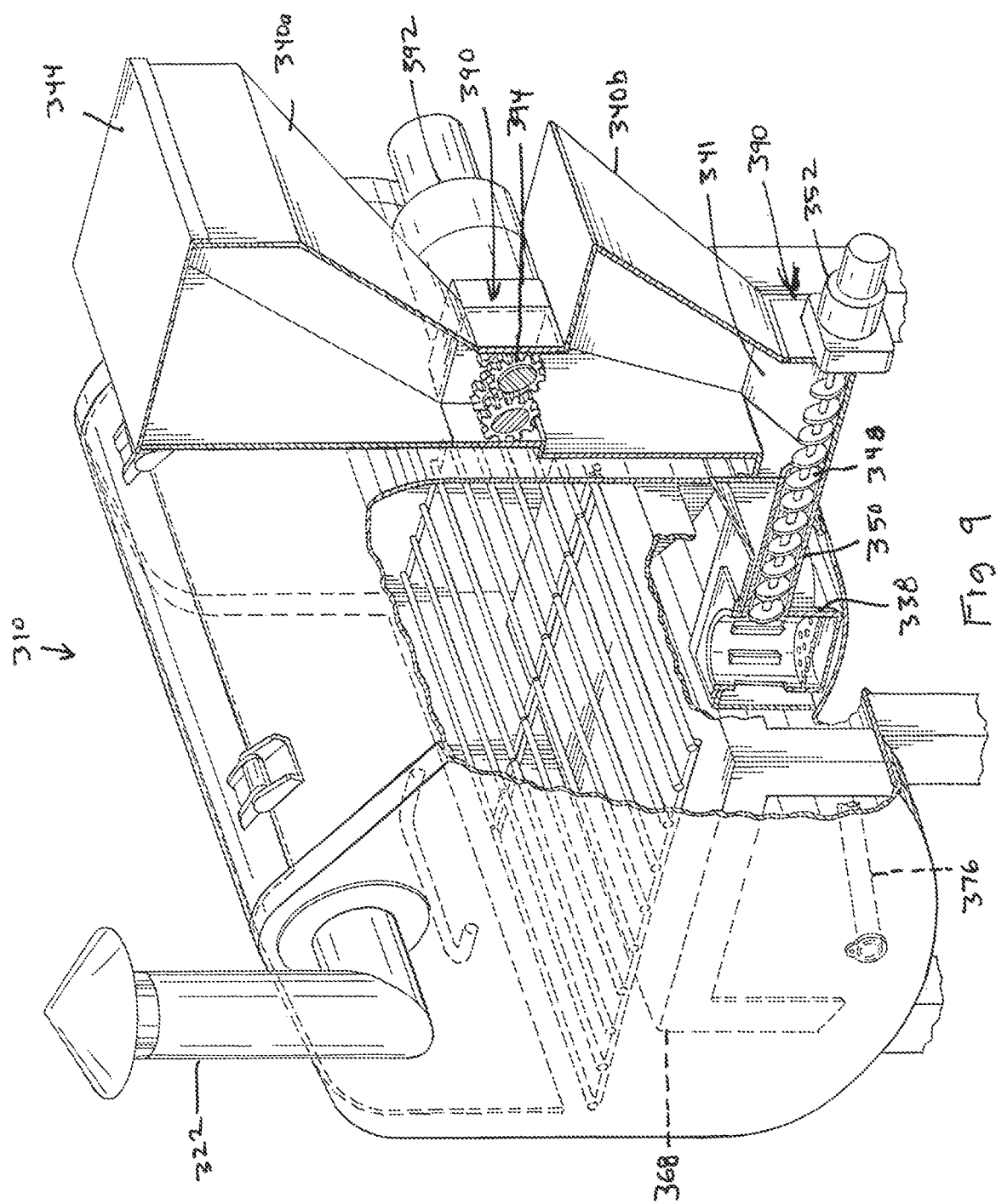
FIG. 9 is a perspective partial cutaway view of a grill, according to some embodiments of the present disclosure.

In some embodiments, a temperature sensor 208 is provided at the top of the housing 212 on an inside surface thereof. Temperature sensor can be pointed at the food Referring to FIGS. 8-10, perspective, perspective partial cutaway, and side cross-sectional views, respectively, of a grill 310 with a fuel conditioner, such as wood chip conditioner 390, are shown, according to some embodiments of the present disclosure. Grill 310 includes housing 312, exhaust conduit 322, lid 344, control unit 356, conduit 376, burn box 338, wood chip conditioner 390, motor 392, gears 394, auger 348, channel 350, motor 352, inclined surface 341, and heat plate 368 that are configured and operate similar to the housing 212, exhaust conduit 222, lid 244, control unit 256, conduit 276, burn box 238, wood chip conditioner 290, motor 292, gears 294, auger 248, channel 250, motor 252, inclined surface 241, and heat plate 168 described with reference to FIGS. 5A-7B to cook food 102 using wood chips 90 conditioned into conditioned wood chips 91. Further, as shown in FIGS. 8-10, grill 310 includes a primary (wood chip) hopper 340a for storing unconditioned wood chips 90 and a secondary (conditioned wood chip) hopper 340b for storing conditioned wood chips 91. In such embodiments, the primary hopper 340a can be positioned above the wood chip conditioner 390 to receive unconditioned wood chips 90 through the opening covered by lid 344, while the secondary hopper 340b can be positioned beneath the wood chip conditioner 390 to receive conditioned wood chips 91 from the wood chip conditioner 390.

In some embodiments, control unit 356 can operate similarly to control unit 256 described with reference to FIGS. 5A-7B. Referring to FIGS. 8-10, in some embodiments, control unit 356 can adjust control parameters of one or both of the wood chip conditioner 390 and the auger 348 (for example, control parameters of the motors 392 and 352, respectively) to assist with moderating temperature within the heating chamber of the housing 312. In some embodiments, control unit 356 can operate wood chip conditioner 390 to produce a reserve of conditioned wood chips 91. For example, when a user sets a desired temperature and time for maintaining that temperature using the user interface elements of control unit 356, the control unit 356 can estimate an amount of conditioned wood chips 91 to be used to maintain that desired temperature for the desired amount of time. The estimated amount of conditioned wood chips 91 can be, for example, an estimated minimum amount of wood chips. Control unit 356 can operate a control parameter of the motor 392 to produce the estimated amount of conditioned wood chips 91. In some embodiments, control unit 356 accomplishes this by operating motor 392 for a calculated amount of time.

In some embodiments, one or more sensors are fitted in or proximate to the secondary hopper 340b and/or wood chip conditioner 390 to measure an amount of conditioned wood chips 91 in the secondary hopper 340b and/or an amount of conditioned wood chips 91 produced by the wood chip conditioner 390. Control unit 356 can monitor the one or more sensors and use the monitored values to control the operation of the wood chip conditioner 390, for example to maintain a desired amount of conditioned wood chips 91 in the secondary hopper 340b and/or to produce the estimated amount of conditioned wood chips 91 described above.

In some embodiments, one or more of secondary hopper 340b and/or primary hopper 340a can include an agitator, such as, but not limited to a mixer blade or a source of vibration (not shown) to agitate conditioned wood chips 90 and/or wood chips 91 to facilitate flow through wood chip conditioner 390 and/or to auger 348. Similar agitators can be fitted, for example, in the hoppers 140 and 240 described above with reference to FIGS. 2-4 and 5A-7B, respectively.

FIG. 11 shows a partial cutaway view of a grill 410, according to some embodiments. Grill 410 can include housing 412, exhaust conduit 422, hopper 440, lid 444, control unit 456, conduit 476, burn box 438, wood chip conditioner 490, motor 492, gears 494, auger 448, channel 450, auger motor 452, inclined surface 441, and heat plate 468 that are configured and operate similar to the housing 212, exhaust conduit 222, lid 244, control unit 256, conduit 276, burn box 238, wood chip conditioner 290, motor 292, gears 294, auger 248, channel 250, motor 252, inclined surface 241, and heat plate 168 described with reference to FIGS. 5A-7B to cook food 102 using wood chips 90 conditioned into conditioned wood chips 91. While FIG. 11 shows a grill 410 with hopper 440 and wood chip conditioner 490 mounted on a left side of the grill 410, a person of ordinary skill in the art would understand that the hopper could be mounted at other locations on the grill 410, such as, but not limited to, a back side or a right side. While FIG. 11 shows the grill 410 having a window on the housing 412, the window can be placed elsewhere or omitted.

Figure 12:
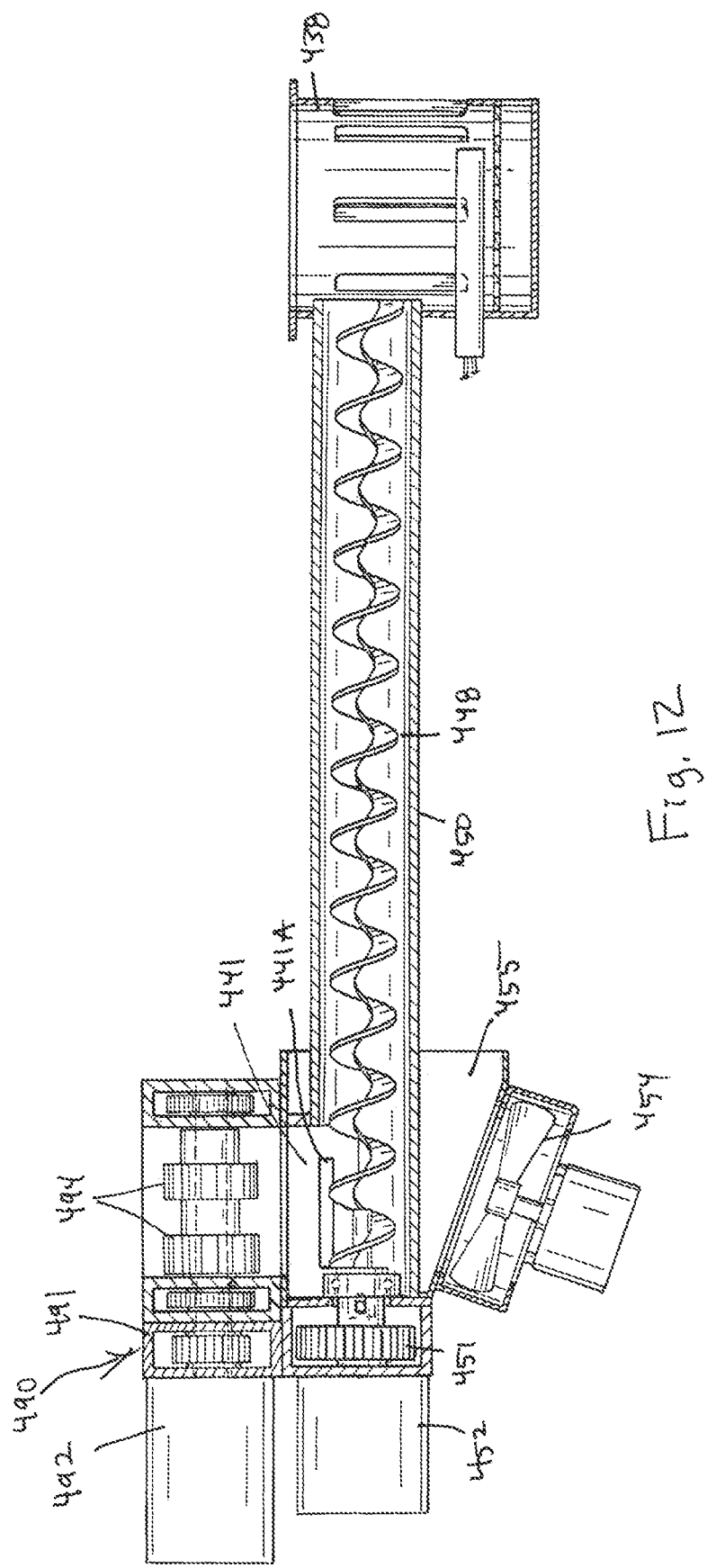
FIG. 12 is a cutaway view of a wood chip conditioner, auger assembly, fan, chamber, and burn box, according to some embodiments of the present disclosure.

As shown in FIG. 11, the grill 410 can further include a fan 454 and air chamber 455, and embodiment of which is described in more detail with reference to in FIG. 12, in which like numbers describe similar elements. As shown in FIG. 12, wood chip conditioner 490 can include a gearbox 491 to connect motor 492 to gears 494. A gearbox 451 can connect motor 452 to auger 448. In some embodiments, motors 492 and 452 are replaced with a single motor, and gearboxes 491 and 451 are replaced with a single gearbox having at least two outputs to control the operation of gears 494 and auger 448.

In some embodiments, a fan 454 can be included, for example beneath or in proximity to the channel 450. As shown in FIGS. 11 and 12, the fan 454 can be used to create a positive pressure in a chamber 455. Chamber 455 can be fluidly connected to an outlet, such as slot 441A on inclined surface 441. Air can therefore flow from chamber 450 through slot 441A, which serves as an opening into the outlet of the wood chip conditioner 490 and into the channel 450. Such a configuration also creates a positive pressure in the channel 450, which in some embodiments can prevent smoke, flames, spent fuel, or other matter from escaping from burn box 438 into the channel 450. This can advantageously prevent fires from occurring in channel 450. A person of ordinary skill in the art would understand from the present disclosure that other configurations of a fan 454 and chamber 455 are contemplated in order to provide positive pressure through channel 450 and into burn box 438. The operational status of fan 454, such as whether the fan is on and the fan speed, can be controlled by control unit 456.

Figure 13:
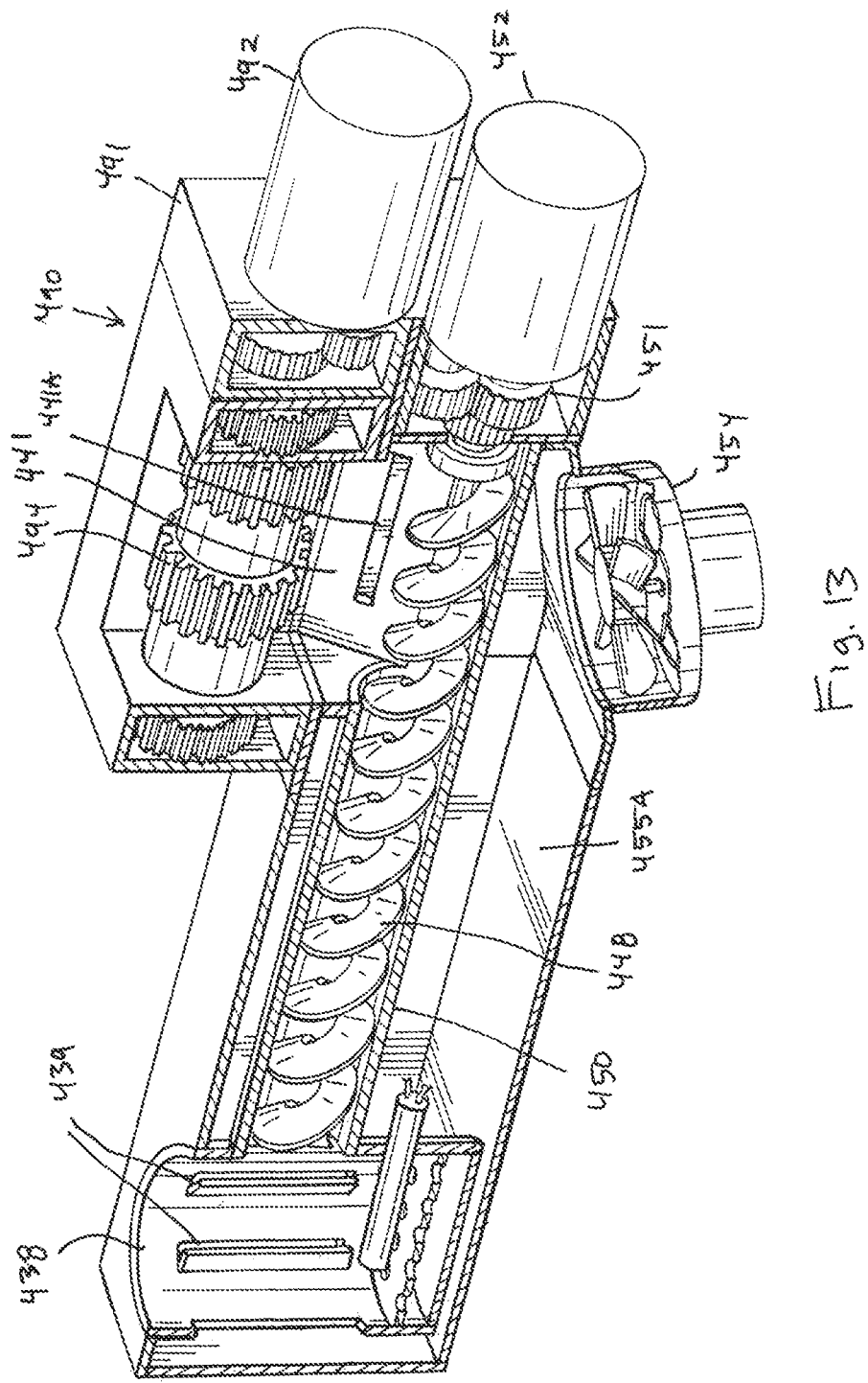
FIG. 13 is a perspective cutaway view of a wood chip conditioner, auger assembly, fan, chamber, and burn box, according to some embodiments of the present disclosure.

In some embodiments, chamber 455 can also fluidly connected to slots 439 in the burn box 438, for example as shown with chamber 455A in FIG. 13. This can provide burn box 438 with a fresh air supply while avoiding smoke, flames, spent fuel, or other matter from escaping the burn box 438. While a single fan 454 can advantageously provide positive pressure both via slot 441A and slots 439, a person of ordinary skill in the art would understand from the present disclosure that multiple fans and chambers can be used. A person of ordinary skill in the art would also understand from the present disclosure that other types of openings could be used in addition or as an alternative to slots 441A and/or 439, such as, but not limited to perforations, holes. In some embodiments, vent gratings are used to reduce the likelihood that matter enters through the openings into the chambers 455A/455.

Figure 14:
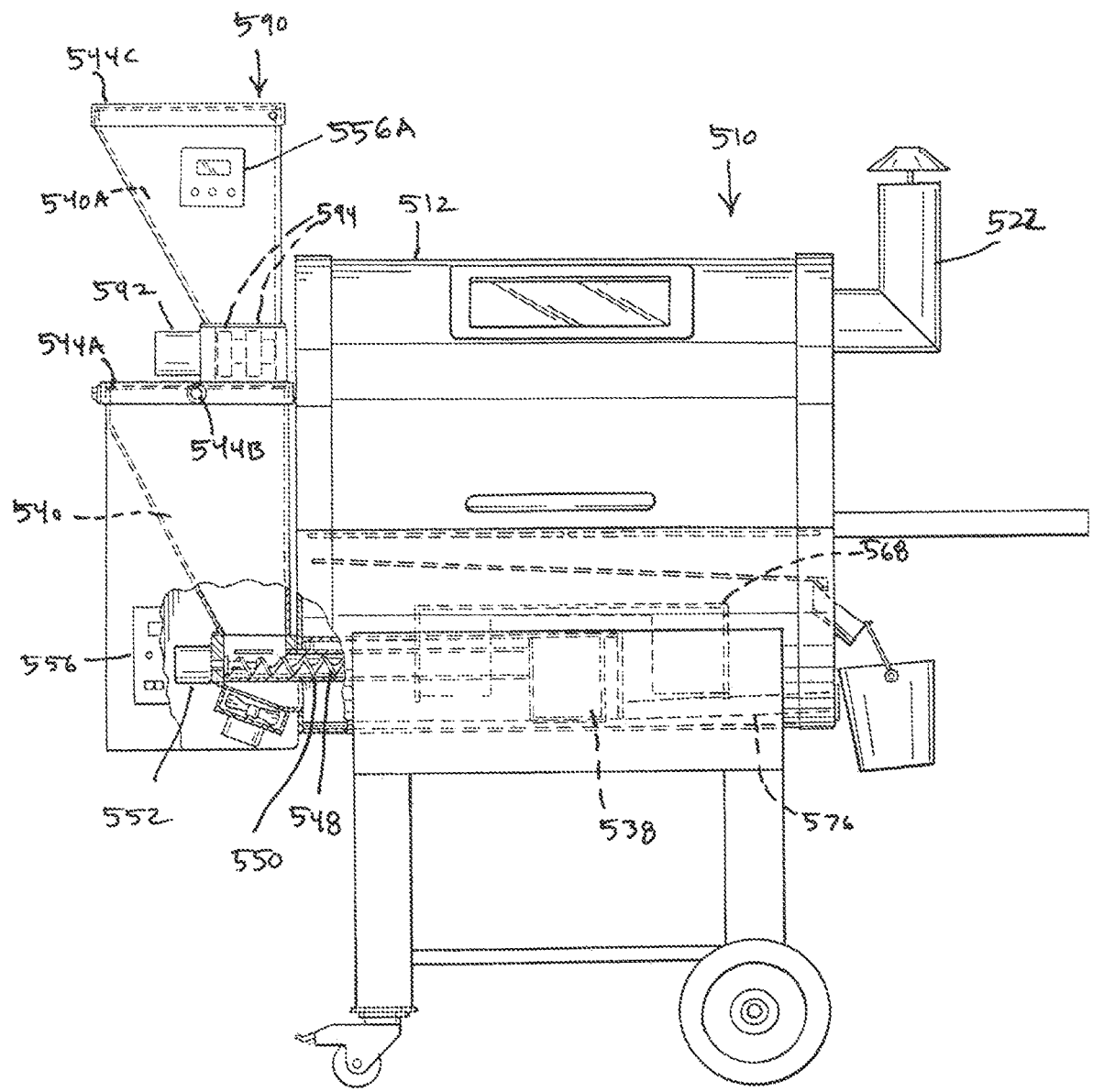
FIG. 14 is a partial cutaway view of a cooking apparatus with a standalone wood chip conditioner, according to some embodiments of the present disclosure.

With reference to FIG. 14, in some embodiments an existing pellet grill can be converted into a grill configured to use wood chips by attaching a standalone wood chip conditioner 590. As shown in FIG. 14, pellet grill includes many of the same features as grill 410, such as auger 548, motor 552, channel 550, hopper 540, control unit 556, burn box 548, heat shield 578, exhaust conduit 522, housing 512. However, grill 510 may not have been provided with a wood chip conditioner. Accordingly, in some embodiments, grill 510 can be retrofitted with wood chip conditioner 590 to enable cooking food using wood chips. For example, a lid of the hopper 540 can be opened or removed, and standalone wood chip conditioner 590 can be added in place thereof. Standalone wood chip conditioner 590 includes a mating member 544A having a seal that mates with the upper edge of hopper 540. Optionally, bolts or any other fixing mechanism can be used to secure the wood chip conditioner 590 to the hopper 540. Mating member 544A can include an opening through which conditioned wood chips can flow. Standalone wood chip conditioner 590 can further include a motor 592 that operates gears or another conditioning mechanism 594 to condition wood chips, a hopper 540A for storing unconditioned wood chips, a lid 544C, and a control unit 556A. During operation, control unit 556A can operate standalone wood chip conditioner 590 to condition wood chips from hopper 540A using motor 592 to control conditioning mechanism 594. In some embodiments, control unit 556A connects (wirelessly, with a wire, or through any mechanism) to control unit 556 in order to share information in one or more directions. For example, control unit 556A can receive control information such as temperature information and/or information about the operation of the motor 552 and control motor 592 to provide sufficient conditioned wood chips to maintain a desired temperature inside the grill housing 512. In some embodiments, control unit 556A is directly controlled by control unit 556. In some embodiments, control unit 556A does not communicate with control unit 556, and instead is operated independently to condition wood chips. Such embodiments can include manual control (e.g., as an on/off switch) with input from a user and/or the use of one or more sensors to detect an amount of conditioned wood chips in hopper 540 and provide sufficient conditioned wood chips to maintain a particular amount of wood chips in hopper 540. A sensor can include, but is not limited to, a proximity sensor at the base of the standalone wood chip conditioner 590.

In some embodiments, control units 156, 256, 356, and 456 contain a safety mechanism, such as, but not limited to, a kill switch that cuts power to wood chip conditioners 190, 290, 390, 490 when lids 144, 244, 344, 444 are determined to be open, respectively (e.g., based on a reading from a sensor, such as, but not limited to a switch or a proximity sensor). Control units 156, 256, 356, and 456 can also be connected to sensors in or near the channels 150, 250, 350, 450, such as, but not limited to temperature sensors to detect a fire therein. In the event that a fire is detected, the control units 156, 256, 356, and 456 can cease operation of the grill, for example by cutting power to augers, ignitors, etc. and sealing vents to the grill to reduce airflow.

The devices, systems, and methods disclosed herein are not to be limited in scope to the specific embodiments described herein. Indeed, various modifications of the devices, systems, and methods in addition to those described will become apparent to those of skill in the art from the foregoing description and accompanying figures. Such modifications are intended to fall within the scope of the appended claims.

What is claimed is:

1. A cooking apparatus comprising:
an enclosure defining a heating chamber configured to be heated and used for cooking food;
a burn box proximate to the enclosure and which is configured to provide heat to the heating chamber;
a hopper configured to hold fuel and having a lower opening;
a fuel conditioner disposed between the hopper and the burn box to condition the fuel prior to burning in the burn box, the lower opening of the hopper being coupled to the fuel conditioner;
an inclined surface positioned below the fuel conditioner, the inclined surface being flat and having at least one ventilation opening formed therein;
a channel extending from the inclined surface to the burn box, the channel configured to conduct wood chips from the fuel conditioner to the burn box, the channel defining an auger opening, the inclined surface extending to the auger opening, the at least one ventilation opening providing ventilation to the channel; and
an auger disposed at least partially within the channel and across the auger opening, the auger configured to move conditioned fuel from the fuel conditioner to the burn box, a portion of the auger extending outwardly from the channel and across the inclined surface and below the fuel conditioner, the inclined surface extending between the fuel conditioner and the auger, the at least one ventilation opening being positioned between the fuel conditioner and the portion of the auger.

2. The cooking apparatus of claim 1, wherein the fuel comprises wood chips.

3. The cooking apparatus of claim 2, wherein the fuel conditioner comprises a wood chipper.

4. The cooking apparatus of claim 3, wherein the wood chipper comprises a plurality of gears.

5. The cooking apparatus of claim 2, wherein the wood chips have an average length of between ⅜ inches to 2⅛ inches.

6. The cooking apparatus of claim 2, wherein the fuel conditioner transforms the fuel into at least one of smaller or more uniform wood chips.

7. The cooking apparatus of claim 1, wherein the fuel conditioner is disposed between the hopper and the channel.

8. The cooking apparatus of claim 1, further comprising:
an air chamber;
a fan fluidly coupled to the air chamber to provide positive pressure in the air chamber, wherein the at least one ventilation opening in the inclined surface is fluidly coupled to the air chamber to provide positive pressure to the channel, the channel being a first channel; and
a second channel fluidly coupling the air chamber to one or more slots in the burn box.

9. The cooking apparatus of claim 1, wherein the fuel conditioner modifies one or more of a size, shape, or a uniformity of the fuel.

10. The cooking apparatus of claim 1, further comprising a control unit configured to control a temperature within the heating chamber.

11. The cooking apparatus of claim 10, wherein the control unit controls the temperature within the heating chamber at least in part by adjusting an amount of conditioned fuel supplied to the burn box at least in part by changing a control parameter of the fuel conditioner.

12. The cooking apparatus of claim 10, further comprising:
an auger disposed at least partially within the channel and configured to move conditioned fuel from the fuel conditioner to the burn box and wherein the control unit controls the temperature within the heating chamber at least in part by adjusting an amount of conditioned fuel moved to the burn box by the auger by changing a control parameter of the auger.

13. The cooking apparatus of claim 10, further comprising a temperature sensor disposed in proximity to the heating chamber, wherein the control unit is configured to control the temperature within the heating chamber based at least in part on an output of the temperature sensor.

* * * * *